(12) United States Patent
Large et al.

(10) Patent No.: US 9,830,003 B2
(45) Date of Patent: Nov. 28, 2017

(54) RING BUTTON COMPONENTS IN ELECTRONICS

(71) Applicant: Microsoft Technology Licensing, LLC, Redmond, WA (US)

(72) Inventors: Timothy Large, Bellevue, WA (US); Kurt A. Jenkins, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/829,452

(22) Filed: Aug. 18, 2015

(65) Prior Publication Data

US 2017/0052610 A1 Feb. 23, 2017

(51) Int. Cl.
*G06F 3/033* (2013.01)
*G06F 3/0354* (2013.01)
*G06F 3/0485* (2013.01)

(52) U.S. Cl.
CPC ........ *G06F 3/03545* (2013.01); *G06F 3/0485* (2013.01)

(58) Field of Classification Search
None
See application file for complete search history.

(56) References Cited

U.S. PATENT DOCUMENTS

| | | | |
|---|---|---|---|
| 4,246,439 A | 1/1981 | Romein | |
| 7,342,350 B2 | 3/2008 | Toda | |
| 8,415,572 B2 | 4/2013 | Yang | |
| 2003/0142065 A1 | 7/2003 | Pahlavan | |
| 2007/0080934 A1* | 4/2007 | Chen | G06F 3/0383 345/156 |
| 2007/0159362 A1 | 7/2007 | Shen | |
| 2012/0327042 A1 | 12/2012 | Harley et al. | |
| 2013/0201162 A1 | 8/2013 | Cavilia | |
| 2013/0335380 A1* | 12/2013 | Griffin | G06F 3/03545 345/179 |
| 2014/0028634 A1 | 1/2014 | Krah et al. | |
| 2014/0085269 A1 | 3/2014 | Armstrong-Muntner | |
| 2014/0253469 A1 | 9/2014 | Hicks et al. | |

(Continued)

FOREIGN PATENT DOCUMENTS

| | | | | |
|---|---|---|---|---|
| KR | 1020140109055 | * | 8/2014 | ......... G06F 3/03545 |
| WO | 02091289 A1 | | 11/2002 | |
| WO | 2014115153 A1 | | 7/2014 | |

OTHER PUBLICATIONS

Antonio Villas-Boas, Wacom Intuos Creative Stylus 2, PCMag, retrieved Apr. 16, 2015, 6 pages, http://www.pcmag.com/article2/0,2817,2470699,00.asp.

(Continued)

*Primary Examiner* — Ifedayo Iluyomade
(74) *Attorney, Agent, or Firm* — Lempia Summerfield Katz LLC

(57) ABSTRACT

Ring button devices and systems are disclosed herein. In one example, an electronic stylus is provided. The stylus includes a shaft, a circuit positioned within the shaft, a ring button positioned around an axis of the shaft, and a ring button sensor positioned within the shaft and connected to the circuit. The ring button is configured to contact the ring button sensor to activate a function of the stylus or a function of an electronic device in communication with the stylus.

17 Claims, 5 Drawing Sheets

(56) References Cited

U.S. PATENT DOCUMENTS

| | | | |
|---|---|---|---|
| 2014/0313171 A1* | 10/2014 | Hong | G06F 3/0227 345/184 |
| 2015/0015549 A1 | 1/2015 | Lu et al. | |
| 2015/0205383 A1* | 7/2015 | Chang | G06F 3/0383 345/179 |
| 2016/0054821 A1* | 2/2016 | Kim | G06F 3/03545 345/179 |
| 2016/0259766 A1* | 9/2016 | Ivanov | G06F 17/241 |

OTHER PUBLICATIONS

Rick Rodriguez, "Fujitsu Digitizer Pen T-5000 is a two-button charmer", Surface Pro Artist, Dec. 14, 2013, 12 pages, http://surfaceproartist.com/blog/2013/12/14/fujitsu-digitizer-pen-t-5000-is-a-two-button-charmer.

"International Search Report & Written Opinion Issued in PCT Application No. PCT/US2016/043793", dated Oct. 10, 2016, 10 Pages.

"Second Written Opinion Issued in PCT Application No. PCT/US2016/043793", dated Jul. 12, 2017, 6 Pages.

* cited by examiner

RING BUTTON COMPONENTS IN ELECTRONICS

DESCRIPTION OF THE DRAWING FIGURES

For a more complete understanding of the disclosure, reference is made to the following detailed description and accompanying drawing figures, in which like reference numerals may be used to identify like elements in the figures.

Figure 1:
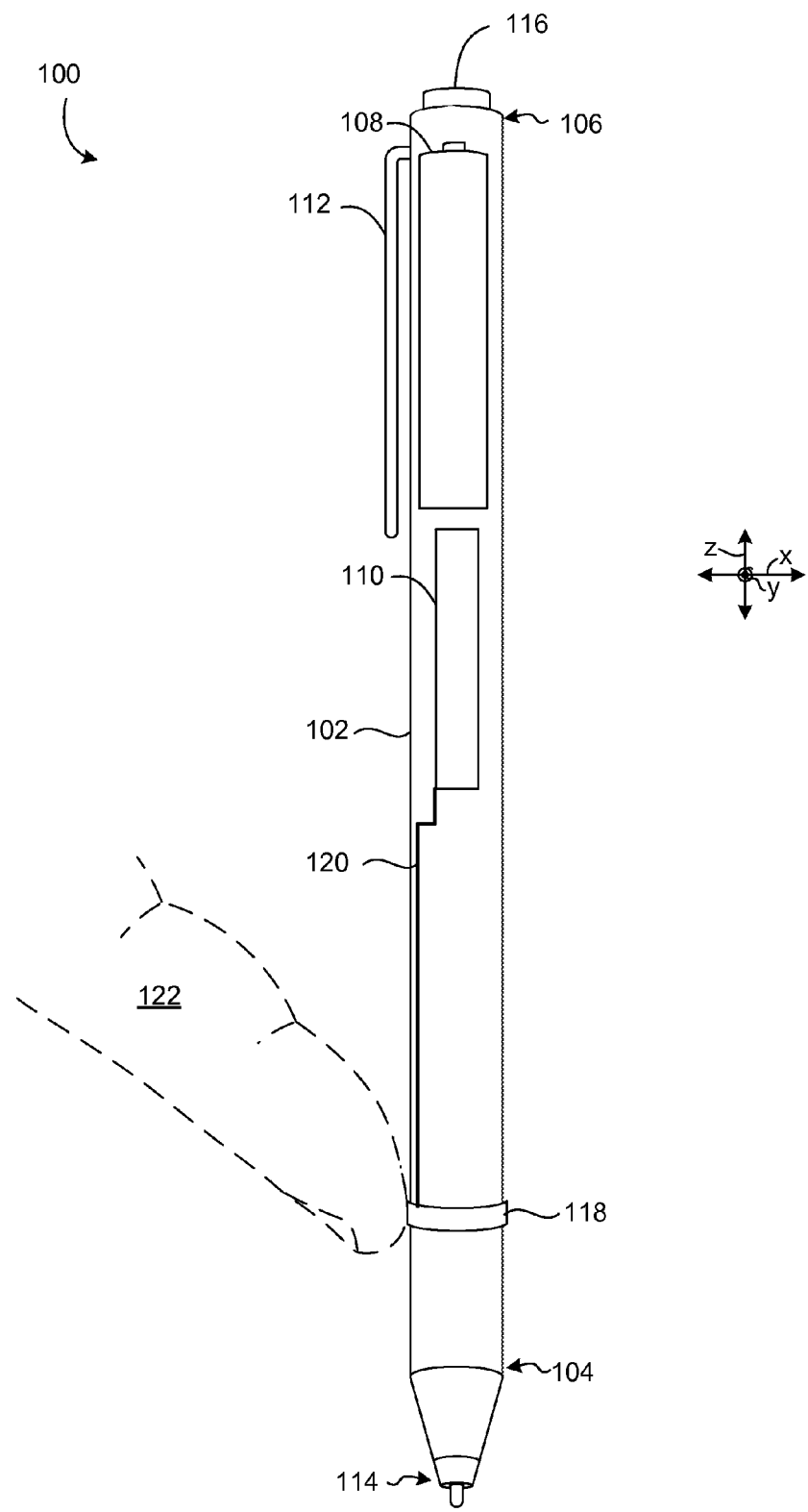
FIG. 1 depicts a stylus having a ring button in accordance with one example.

While the disclosed systems and methods are susceptible of embodiments in various forms, specific embodiments are illustrated in the drawing (and are hereafter described), with the understanding that the disclosure is intended to be illustrative, and is not intended to limit the claim scope to the specific embodiments described and illustrated herein.

DETAILED DESCRIPTION

Disclosed herein are electronic devices and systems having one or more buttons or switches useful for activating a programmable function (e.g., powering the device on or off, selecting or highlighting text, deleting text, copying or pasting content).

In certain electronic stylus devices, the button or switch is positioned within a machined hole or slot of the stylus. In such a configuration, a user may only be able to press or activate the button when the stylus is held in a specific orientation in the user's hand. This is less than ideal, as the user has to be aware of how he or she is holding the stylus in order for the button to be readily accessible.

As disclosed herein, an improved electronic device may include a ring button positioned around an axis of the shaft of a stylus or pen. By providing a button in a ring configuration around the shaft of the stylus, the user is able to hold the stylus in any orientation and yet is still able to activate the switch. This is an improvement over the fixed orientation button extending from a hole or slot in the stylus.

Also disclosed herein, in an alternative example of a ring button configuration, an electronic device may include a display screen (e.g., touchscreen display) and a rotatable ring button partially extending from the edge of the display screen. The partially extending, rotatable ring button on the electronic device may allow a user to press and activate a programmable function as well as rotate the ring button to scroll or move the displayed text or graphics up, down, or across the display screen in order to view a different part of the text or graphics. This provides an alternative to a user touching the display screen to activate a programmable function or to move the text or graphics.

In certain examples, the ring button on the stylus or the ring button extending from a display of an electronic device may be capable of providing haptic response or an auditory click for positive feedback to the user. Such positive feedback may be provided through the use of a piezoelectric film for switch activation. These features, and others, are discussed in greater detail below with reference to the examples and figures below.

Exemplary Configurations of Electronic Devices

Stylus Device with Ring Button

FIG. 1 depicts a non-limiting example of an electronic stylus device 100 having a ring button. In this example, the electronic stylus device 100 includes a shaft 102 extending between a first end 104 and second end 106. The shaft 102 is a hollow cylinder or tube having an internal housing area for a battery 108 and a circuit 110 (e.g., printed circuit board). A clip 112 also extends from the shaft 102 near the second end 106 of the shaft 102.

In the depicted example, the battery 108 and circuit 110 (e.g., printed circuit board) are positioned closer to the second end of the shaft 106. In other examples, the positioning of the internal components of the shaft 102 may be different. The battery 108 provides power to the circuit 110 for operating the stylus. The battery 108 may be any battery form, or any number of batteries depending on the desired stylus shape and desired voltage level. For example, an AAA alkaline battery may be used. The battery 108 may be rechargeable. A battery charge circuit and charge status LED may also be included in the electronic stylus device 100. In certain examples, the stylus may be powered or charged by an external power source (e.g., an AC or DC adapter).

The circuit 110 may be configured to correspond to a computing device (e.g., electronic display device). For example, the circuit 110 may be in wireless communication with an analog-digital converter (ADC), firmware, and/or a processor and memory associated with the computing device. The wireless connection may comply with a standard such as Bluetooth, IEEE 802.11 (wireless LAN), ultra-wide band (UWB) radio link, or infrared data association (IrDA) link.

The shaft 102 may be manufactured of one or more plastics, metals, acrylics, carbon fibers, or polymers. In certain examples, the shaft material may be an electrically conductive material.

A tip sensor (e.g., sensing tip) 114 is positioned relative to the first end 104 of the shaft 102. The tip sensor 114 may be connected to the circuit 110. The tip sensor 114 is configured to touch or interact with a touchscreen or display screen of an associated electronic device (i.e., any electronic device in physical or wireless communication with the stylus) through the connected circuit 110. The panel may be a resistive touch panel, a capacitive touch panel, an ultrasonic touch panel, a light (infrared) sensor type touch panel, an electromagnetic touch panel, or a sound wave touch panel. For example, the electronic device having the resistive touchscreen enables a user to use the sharp end of the stylus and apply a predetermined pressure to activate the touch screen. In the case of the capacitive touch panel, the tip of the stylus contacting a touchscreen is formed of a conductive material. Also, in the case of the electromagnetic touch panel, the electronic device may be configured such that a coil and a magnetic body are provided inside a stylus to generate a resonance frequency depending on electromagnetic induction, and a separate digitizer inside the electronic device reads a relevant position of the stylus.

The tip sensor 114 may have one of a variety of configurations including but not limited to a ballpoint, a ring tip, a fine tip, or other low contact area geometry. The tip sensor 114 may be manufactured of one or more plastics, metals, acrylics, carbon fibers, or polymers. In certain examples, the tip sensor material may be an electrically conductive material. The tip sensor 114 may be coated with a suitable material to prevent scratching the surface of the touch screen of the associated electronic device. For example, the tip sensor 114 may be coated with a scratch resistant polymer such as polytetrafluoroethylene or poly(methyl methacrylate).

An end button 116 is positioned at the second end 106 of the shaft 102, opposite from the tip sensor 114. The end button 116 may be connected to the circuit 110 of the stylus device 100. The circuit 110 may be configured in a variety of ways to detect activation of the end button 116, such as a capacitive sensor array, resistive touch sensor, a plurality of pressure sensitive sensors (e.g., membrane switches using a pressure sensitive ink), mechanical switches, optical sensors, other input sensing mechanisms, or a combination thereof. In one example, the circuit 110 (e.g., printed circuit board) includes a layer of force-sensing material that may detect pressure applied to end button 116 by a user. The circuit 110 may further include various electronic components and circuits to detect and process user input.

In one particular example, the end button 116 may be connected with the circuit 110 via a piezoelectric sensor (e.g., a piezoelectric film), wherein the sensor is configured to measure changes in pressure, acceleration, temperature, strain, or force by converting them into an electrical charge. In such an example, pressing or squeezing the end button 116 into the sensor (e.g., film) and into the shaft 102 of the stylus device 100 generates an electrical connection or a change in the electrical connection with the circuit 110.

The electrical connection may provide haptic feedback and/or a clicking sound upon pressing or activating the end button 116. This is beneficial for the user of the stylus device, as haptic feedback or a clicking sound provides sensory or auditory notification, respectively, to the user of the activation of the end button 116.

The end button 116 is configured to communicate with the associated computing device and activate at least one programmable function of the electronic stylus device 100. For example, the end button may be configured to power the stylus device on or off, open an application on the associated computing device (e.g., a tablet computer), switch or toggle between open applications on the associated computing device, select or highlight text, delete text, or copy or paste content. The programmable task may be activated by touching the end button 116, pushing the end button 116 into the housing of the stylus, or applying an amount of pressure on the surface of the end button 116.

The end button 116 may be programmed to perform a series of different tasks in a defined order. In other words, in certain circumstances, a first activation of the end button 116 may perform a first task, and a second activation of the end button 116 may perform a second, different task. For example, the end button 116 may be activated a first time to copy selected text or content displayed on the touchscreen. The end button 116 may be activated a second time to paste the copied text/content at an identified location.

The end button 116 may be programmable to perform a specific task or a specific series of tasks based on the proximity of the stylus device 100 to the touchscreen of the associated computing device. For example, when a sensor (e.g., tip sensor 114) of the stylus device 100 is within a defined distance (e.g., less than 5 cm, 4 cm, 3 cm, 2 cm, or 1 cm) of the touchscreen surface of the computing device, the end button 116 may be activated to perform a first task. Additionally, when the sensor (e.g., tip sensor 114) of the stylus device 100 is greater than a defined distance (e.g., greater than 1 cm, 2 cm, 3 cm, 4 cm, or 5 cm) from the touchscreen surface, the end button may be activated to perform a second, different task. In some examples, the first task may be selecting or highlighting test on the touchscreen surface, deleting text, copying or pasting content, while the second task may be powering the stylus device on or off, opening an application on an associated computing device (e.g., a tablet computer), or switching or toggling between open applications on the associated computing device.

The end button 116 may be manufactured from any material capable of creating a connection with the circuit 110. For example, the end button 116 may be made from one or more plastics, metals, acrylics, carbon fibers, or polymers (e.g., elastomeric polymers). In certain examples, the end button material may be an electrically conductive material. In certain examples, the end button material is the same material as the shaft of the stylus. In other examples, the end button material is a different material from the shaft material, which may allow for easier visual or sensory identification for the user of the location of the end button.

A ring button 118 is positioned along the shaft 102. The ring button 118 may be positioned at any location along the shaft 102. As depicted in FIG. 1, the ring button 118 is positioned closer to the first end 104 than the second end 106. This positioning may allow the user to activate or press the ring button 118 with one or more fingers while holding the stylus device 100.

In certain examples, the exterior of the ring button 118 is exposed. In other examples, the exterior of the ring button 118 is at least partially covered, e.g., by a layer of film or mesh structure of the shaft 102. In other words, a user may activate the ring button by direct or indirect contact with the ring button 118.

Like the end button 116, the ring button 118 may be connected to the circuit 110 of the stylus device 100 via a sensor 120. The sensor 120 may be a capacitive sensor array, resistive touch sensor, a plurality of pressure sensitive sensors (e.g., membrane switches using a pressure sensitive ink), mechanical switches, optical sensors, other input sensing mechanisms, or a combination thereof. In one example, the circuit 110 (e.g., printed circuit board) includes a layer of force-sensing material that may detect pressure applied to the ring button 118 by a user. The circuit 110 may further include various electronic components and circuits to detect and process user input.

In one particular example, the ring button 118 may be connected with the circuit 110 via a resistive touch sensor configuration. When a user's finger presses down on the outer surface of the ring button 118, the ring button 118 moves inward to contact the conductive material of the sensor. A change in resistance is identified through the contact, therein activating a programmable function of the stylus device 100.

In another particular example, the ring button 118 may be connected with the circuit 110 via a piezoelectric sensor (e.g., a piezoelectric film), wherein the sensor is configured to measure changes in pressure, acceleration, temperature, strain, or force by converting them into an electrical charge.

A user's finger 122 may apply pressure to an external location of the ring button 118. When the applied pressure exceeds a designed threshold level, at least part of the ring button moves inward toward the center of the shaft 102 to make contact or increase the amount of contact with the sensor 120 (e.g., piezoelectric film) In some examples, the surface of the ring button on the opposite end of the ring may extend outward from the shaft. The inward movement of the ring button generates an electrical connection, or a change in the electrical connection, with the circuit 110.

The threshold level of pressure may be designed such that accidental contact with the ring button 118 does not move the ring button 118, change the amount of contact with the sensor 120, or activate a function of the stylus device. In one example, one or more springs are positioned between the inside surface of the ring button 118 and the sensor 120. In such an example, a threshold amount of pressure is required to compress the spring and allow the ring button and sensor to contact each other or increase the amount of contact with each other. Upon removal of the pressure, the compressed spring expands to return the ring button 118 to its steady state or original location.

In another example, magnets are positioned between the inside surface of the ring button 118 and the sensor 120. In a steady state, without external forces acting upon the ring button 118, the magnets are positioned to repel the ring button 118 from making contact or increasing contact with the sensor 120. A threshold amount of pressure is required to overcome the repelling force of the magnets in order for the ring button to contact or increase contact with the sensor 120. In such an example, upon removal of the pressure, the repelling force of the magnet is configured to return the ring button to its steady-state location.

The electrical connection may provide haptic feedback and/or a clicking sound upon pressing or activating the ring button 118. This is beneficial for the user of the stylus device, as haptic feedback or a clicking sound provides sensory or auditory notification to the user of the activation of the ring button 118.

In certain examples, in addition to movement of the ring button to make contact with the sensor, the ring button 118 may be configured as a wheel to rotate about an axis. For example, with reference to FIG. 1, the ring button may rotate about the z-axis (i.e., the axis running the length of the shaft 102 of the stylus device 100. A rotary encoder or the sensor 120 of the stylus device 100 may detect rotation of the ring button 118. In certain examples, the sensor may have a series of circumferential markings or tracks etched or printed onto the surface of the sensor 120 (e.g., the piezoelectric film) facing the inside surface of the ring button 118. The internal surface of the ring button 118 facing the sensor 120 may be marked or notched as well. The sensor 120 tracks the mark or notch on the internal surface of the ring button, and the amount of movement is relayed to the circuit 110 for processing.

The ring button 118 is configured to communicate with the associated computing device and activate at least one programmable function of the electronic stylus device 100 via the circuit 110. Pressing the ring button 118 into the housing of the stylus, applying an amount of pressure on the surface of the ring button 118, or rotating the ring button 118 about an axis may activate the programmable function. For example, by pressing the ring button 118, the stylus device 100 may be configured to be powered on or off, an application may be opened on an associated computing device (e.g., a tablet computer), applications on the associated computing device may be switched/toggled, text or content on the computing device may be selected, highlighted, deleted, copied or pasted.

Alternatively, rotating the ring button 118 about the z-axis may activate a programmable task. For example, moving or rotating the ring button 118 may instruct the associated computing device to scroll through content displayed on the computing device (e.g., a document or webpage).

In certain examples, the ring button 118 may be programmed to perform a series of different tasks in a defined order. In other words, in certain circumstances, a first activation (e.g., pressing) of the ring button 118 may perform a first task, and a second activation (e.g., pressing) of the ring button 118 may perform a second, different task. For example, the ring button 118 may be activated a first time to copy selected text or content displayed on the touchscreen. The ring button 118 may be activated a second time to paste the copied text/content at an identified location.

In certain examples, the ring button 118 may be programmable to perform a specific task or a specific series of tasks based on the proximity of the stylus device 100 to the touchscreen of the associated computing device. For example, when a sensor (e.g., tip sensor 114) of the stylus device 100 is within a defined distance (e.g., less than 5 cm, 4 cm, 3 cm, 2 cm, or 1 cm) of the touchscreen surface of the computing device, the ring button 118 may be activated to perform a first task. Additionally, when the sensor (e.g., tip sensor 114) of the stylus device 100 is greater than a defined distance (e.g., greater than 1 cm, 2 cm, 3 cm, 4 cm, or 5 cm) from the touchscreen surface, the ring button 118 may be activated to perform a second, different task. In some examples, the first task may be selecting or highlighting test on the touchscreen surface, deleting text, copying or pasting content, while the second task may be powering the stylus device on or off, opening an application on an associated computing device (e.g., a tablet computer), or switching or toggling between open applications on the associated computing device.

The ring button 118 may be manufactured from any material capable of creating a connection with the circuit 110. For example, the ring button 118 may be made from one or more plastics, metals, acrylics, carbon fibers, or polymers (e.g., elastomeric polymers). In certain examples, the ring button material may be an electrically conductive material. In certain examples, the ring button material is the same material as the shaft of the stylus. In other examples, the ring button material is a different material from the shaft material, which may allow for easier visual or sensory identification for the user of the location of the ring button.

In some examples, the ring button 118 may be identified by a different color from the shaft 102 of the stylus 100. This may provide easier visual identification for the user of the location of the ring button 118.

In certain examples, the ring button includes a plurality of segments around an axis of the shaft of the electronic stylus device.

Figure 2:
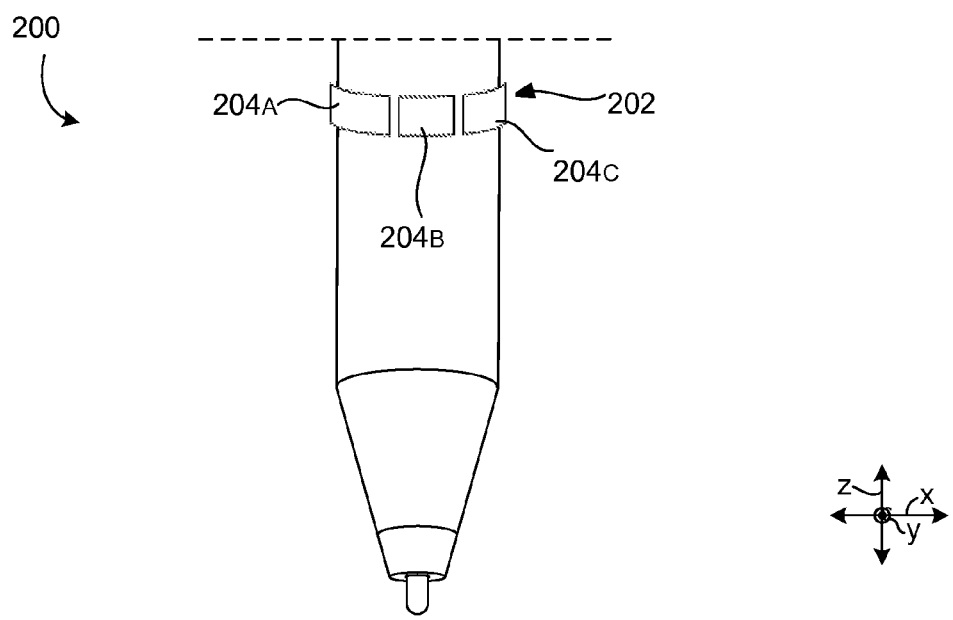
FIG. 2 depicts a portion of stylus having a ring button with a plurality of segments in accordance with one example.

FIG. 2 depicts an example of a portion of a stylus device 200 having a ring button 202 with multiple segments 204*a*, 204*b*, 204*c*. Such a device may provide an improved design or ease of use over a similar device having a single ring button. In such an example, a user may press one or more of the segments 204*a*, 204*b*, 204*c* of the ring button 202 in order to activate the programmable function of the stylus device 200. Each segment 204*a* of the ring button 202 may activate the same programmable function as the remaining segments 204*b*, 204*c* of the ring button 202, therein providing the benefit of the user being able to hold the stylus 200 in any orientation.

In certain examples, the surface of the ring button protrudes from the external surface of the shaft of the stylus (as depicted in FIG. 1). In other words, the external diameter of the ring button is larger than the external diameter of the shaft of the stylus at or near the location of the ring button. This arrangement may allow the user to identify the location of the ring button by viewing the protrusion or feeling the protrusion of the ring button.

Figure 3:
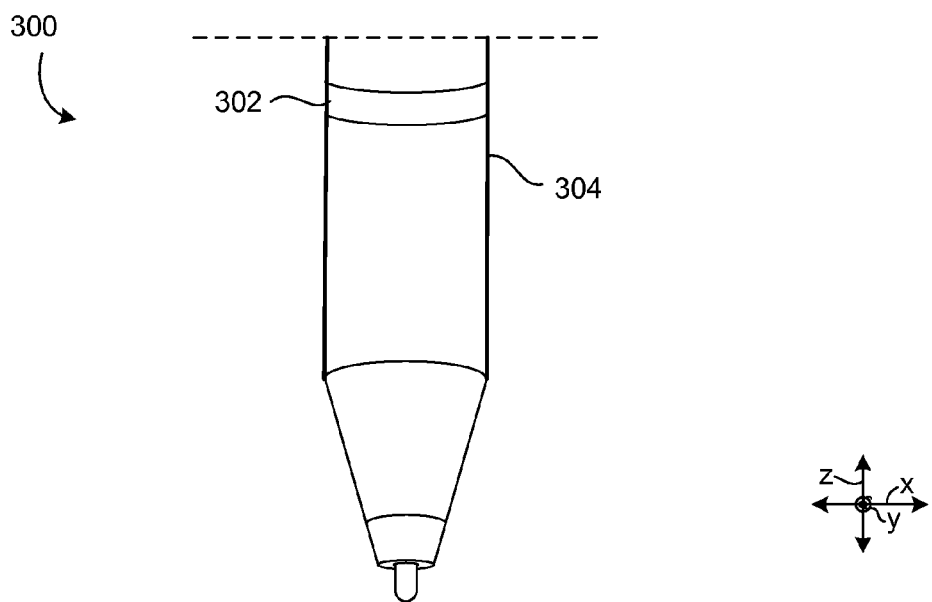
FIG. 3 depicts a portion of a stylus having a ring button in accordance with one example.

In an alternative example, FIG. 3 depicts a portion of a stylus device 300 having a ring button 302. In FIG. 3, the surface of the ring button 302 is flush with the external surface of the shaft 304 of the stylus 300. In other words, the external diameter of the ring button and the external diameter of the shaft are the same. This arrangement with a uniform diameter may allow for the stylus to be more readily stored or secured in a slot of the electronic device with the touchscreen display (e.g., a tablet computer).

Display Device with Ring Button

Figure 4:
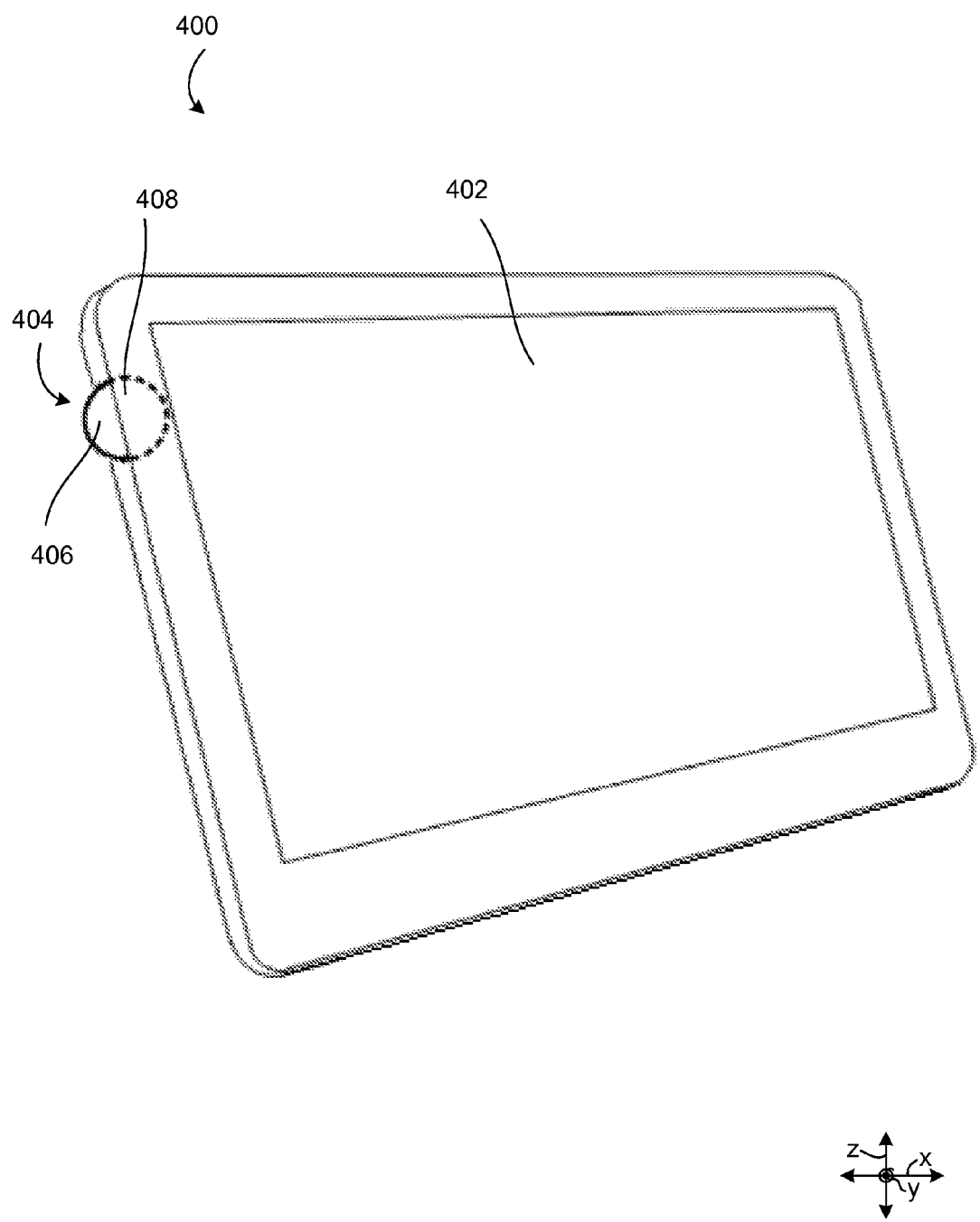
FIG. 4 depicts an electronic device having a ring button in accordance with one example.

FIG. 4 depicts a non-limiting example of an electronic display device 400 having a ring button. The electronic display device 400 may be at least part of a mobile computing device (i.e., a device capable of being transported from one place to another), such as a tablet computer, mobile phone, music device, handheld gaming device, navigation device, wearable device, or other device.

In another example, the electronic display device 400 may be configured for use as a part of a stationary computing device (i.e., a device that remains fixed in one particular location for use). Non-limiting examples of stationary computing devices include computing devices on home appliances such as refrigerators, dishwashers, microwaves, ranges or ovens, furnaces, washers, and dryers. Other non-limiting examples of stationary computing devices include data entry pads such as a thermostat or a keypad lock on a door to a dwelling. Additional examples include televisions, home theater devices (e.g., speakers, receivers, and amplifiers), computer monitors, printers, or scanners.

In this example, the electronic display device 400 is a tablet computer having a display screen 402 and a ring button 404 partially extending from an edge of the electronic display device 400. An exposed area 406 of the ring button 404 is accessible to a user. An embedded area 408 of the ring button 404 is secured internally within the electronic display device 400 (as depicted in dashed line).

The ring button 404 is configured as a wheel to rotate about an axis. As described above with reference to FIG. 1, a rotary encoder or a sensor of the electronic display device 400 may detect rotation of the ring button 404. In certain examples, the sensor may have a series of circumferential markings or tracks etched or printed onto the surface of the sensor (e.g., a piezoelectric film) facing a surface of the ring button 404. A surface of the ring button 404 facing the sensor may be marked or notched as well. The sensor tracks the mark or notch on the surface of the ring button, and the amount of movement is relayed to a circuit for processing.

In addition to rotating about an axis, the ring button 404 may also be pressed or moved inward to activate one or more programmable functions. Like the ring button described with reference to FIG. 1, the ring button 404 depicted in FIG. 4 may be connected with the circuit via a sensor (e.g., a piezoelectric film). A user may apply pressure to an external location of the ring button 404 to make contact with the sensor or increase contact with the sensor. In other words, when the applied pressure exceeds a designed threshold level, at least part of the ring button moves inward toward to make contact or increase the amount of contact with the sensor (e.g., piezoelectric film). The inward movement of the ring button generates an electrical connection, or a change in the electrical connection, with the circuit.

The electrical connection may provide haptic feedback and/or a clicking sound upon pressing or activating the ring button 404. This is beneficial for the user of the electronic display device 400, as haptic feedback or a clicking sound provides sensory or auditory notification to the user of the activation of the ring button 404.

Like the stylus device in FIG. 1, the threshold level of pressure may be designed such that accidental contact with the ring button 404 does not move the ring button 404, change the amount of contact with the sensor, or activate a function of the electronic display device 400. In one example, one or more springs are positioned between the ring button 404 and the sensor. In such an example, a threshold amount of pressure is required to compress the spring and allow the ring button 404 and sensor to contact each other or increase the amount of contact with each other. Upon removal of the pressure, the compressed spring expands to return the ring button 404 to its steady-state location.

In another example, magnets are positioned between the surface of the ring button 404 and the sensor. The magnets may be configured to repel the ring button 404 from making contact or increasing contact with the sensor. A threshold amount of pressure is required to overcome the repelling force of the magnets in order for the ring button 404 to contact the sensor. In such an example, upon removal of the pressure, the repelling force of the magnet is configured to return the ring button 404 to its steady-state location.

Like the example described in FIG. 1, the ring button 404 may be programmable to perform a specific task or a specific series of tasks. Pressing the ring button 404 into the housing of the electronic display device 400, applying an amount of pressure on the surface of the ring button 404, or rotating the ring button 404 about an axis may activate the programmable function. For example, by pressing the ring button 404, the electronic display device 400 may be configured to be powered on or off, an application may be opened on the electronic display device 400, applications on the electronic display device 400 may be switched/toggled, text or content on the electronic display device 400 may be selected, highlighted, deleted, copied or pasted.

Alternatively, rotating the ring button 404 about the axis may activate a programmable task. For example, moving or rotating the ring button 404 may instruct the associated computing device to scroll through content displayed on the computing device (e.g., a Word document or webpage).

Exemplary Computing Environment

Figure 5:
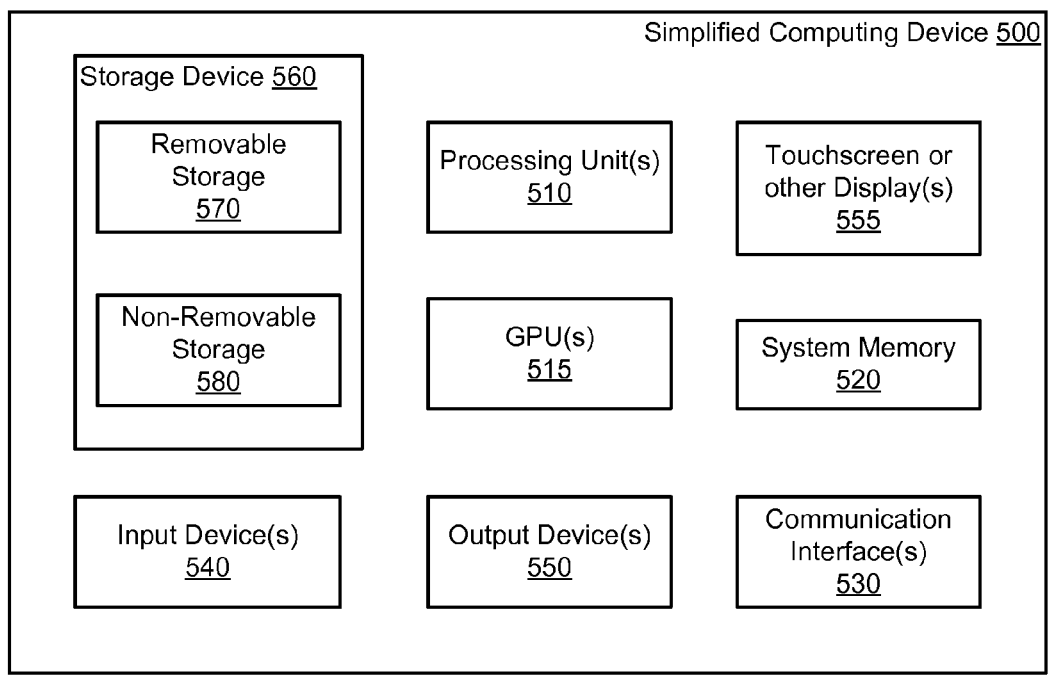
FIG. 5 is a block diagram of a computing environment in accordance with one example for implementation of the disclosed ring button components or aspects thereof.

With reference to FIG. 5, a ring button component as described above may be incorporated within an exemplary computing environment 500. The computing environment 500 may correspond with one of a wide variety of computing devices, including, but not limited to, personal computers (PCs), server computers, tablet and other handheld computing devices, laptop or mobile computers, communications devices such as mobile phones, multiprocessor systems, microprocessor-based systems, set top boxes, programmable consumer electronics, network PCs, minicomputers, mainframe computers, or audio or video media players.

The computing environment 500 has sufficient computational capability and system memory to enable basic computational operations. In this example, the computing environment 500 includes one or more processing unit(s) 510, which may be individually or collectively referred to herein as a processor. The computing environment 500 may also include one or more graphics processing units (GPUs) 515. The processor 510 and/or the GPU 515 may include integrated memory and/or be in communication with system memory 520. The processor 510 and/or the GPU 515 may be a specialized microprocessor, such as a digital signal processor (DSP), a very long instruction word (VLIW) processor, or other microcontroller, or may be a general-purpose central processing unit (CPU) having one or more processing cores. The processor 510, the GPU 515, the system memory 520, and/or any other components of the computing environment 500 may be packaged or otherwise integrated as a system on a chip (SoC), application-specific integrated circuit (ASIC), or other integrated circuit or system.

The computing environment 500 may also include other components, such as, for example, a communications interface 530. One or more computer input devices 540 (e.g., pointing devices, keyboards, audio input devices, video input devices, haptic input devices, or devices for receiving wired or wireless data transmissions) may be provided. The input devices 540 may include one or more touch-sensitive surfaces, such as track pads. Various output devices 550, including touchscreen or touch-sensitive display(s) 555, may also be provided. The output devices 550 may include a variety of different audio output devices, video output devices, and/or devices for transmitting wired or wireless data transmissions.

The computing environment 500 may also include a variety of computer readable media for storage of information such as computer-readable or computer-executable instructions, data structures, program modules, or other data. Computer readable media may be any available media accessible via storage devices 560 and includes both volatile and nonvolatile media, whether in removable storage 570 and/or non-removable storage 580. Computer readable media may include computer storage media and communication media. Computer storage media may include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by the processing units of the computing environment 500.

While the present claim scope has been described with reference to specific examples, which are intended to be illustrative only and not to be limiting of the claim scope, it will be apparent to those of ordinary skill in the art that changes, additions and/or deletions may be made to the disclosed embodiments without departing from the spirit and scope of the claims.

The foregoing description is given for clearness of understanding only, and no unnecessary limitations should be understood therefrom, as modifications within the scope of the claims may be apparent to those having ordinary skill in the art.

Claim Support Section

In a first embodiment, an electronic stylus comprises a shaft having a first end and a second end, a circuit positioned within the shaft, a ring button positioned around an axis of the shaft extending between the first end and the second end; and a ring button sensor positioned within the shaft and connected to the circuit, wherein the ring button is configured to contact the ring button sensor.

In a second embodiment, with reference to the first embodiment, the ring button is configured to contact the ring button sensor to activate a function of the stylus or a function of an electronic device in communication with the stylus.

In a third embodiment, with reference to the first embodiment or the second embodiment, the electronic stylus further comprises a tip sensor positioned at the first end of the shaft and an end button positioned at the second end of the shaft, the end button configured to activate a separate function of the stylus or a separate function of the electronic device in communication with the stylus.

In a fourth embodiment, with reference to the second embodiment or the third embodiment, the function is based on a proximity of a tip sensor of the stylus to a touchscreen surface of the electronic device in communication with the stylus, wherein a first function is activated when the tip sensor is less than a distance from the touchscreen surface and a second function is activated when the tip sensor is greater than the distance from the touchscreen surface.

In a fifth embodiment, with reference to any of embodiments 2-4, the function is programmable.

In a sixth embodiment, with reference to any of embodiments 2-5, the function is a plurality of functions performed in series such that a first contact between the ring button and the ring button sensor activates a first function of the plurality of functions and a second contact between the ring button and the ring button sensor activates a second function of the plurality of functions.

In a seventh embodiment, with reference to any of embodiments 1-6, contact of the ring button with the ring button sensor provides haptic feedback, auditory feedback, or a combination thereof.

In an eighth embodiment, with reference to any of embodiments 1-7, the ring button is configured to rotate about the axis of the shaft.

In a ninth embodiment, with reference to the eighth embodiment, rotation about the axis activates a separate function of the stylus or a separate function of the electronic device in communication with the stylus.

In a tenth embodiment, with reference to any of embodiments 1-9, the ring button comprises a plurality of ring button segments.

In an eleventh embodiment, with reference to any of embodiments 1-10, the ring button sensor is a piezoelectric film sensor.

In a twelfth embodiment, with reference to any of embodiments 1-11, an external diameter of the ring button is greater than an external diameter of the shaft adjacent to the ring button.

In a thirteenth embodiment, with reference to any of embodiments 1-11, an external diameter of the ring button is equal to an external diameter of the shaft adjacent to the ring button.

In a fourteenth embodiment, a system comprises an electronic device having a touchscreen display and an electronic stylus in communication with the electronic device, where the stylus comprises a shaft having a first end and a second end, a circuit positioned within the shaft, a ring button positioned around an axis of the shaft extending between the first end and the second end, and a ring button sensor positioned within the shaft and connected to the circuit, wherein the ring button is configured to contact the ring button sensor.

In a fifteenth embodiment, with reference to the fourteenth embodiment, the electronic device is a tablet computer.

In a sixteenth embodiment, with reference to the fourteenth embodiment or the fifteenth embodiment, the ring button is configured to rotate about the axis of the shaft, wherein rotation of the ring button activates movement of text or graphics on the touchscreen display up or down, or left or right.

In a seventeenth embodiment, with reference to any of embodiments 14-16, the ring button is configured to contact the ring button sensor to activate a function of the stylus or a function of the electronic device in communication with the stylus.

In an eighteenth embodiment, with reference to the seventeenth embodiment, the function is based on a proximity of a tip sensor of the stylus to a surface of the touchscreen display, wherein a first function is activated when the tip sensor is less than a first distance from the surface of the touchscreen display and a second function is activated when the tip sensor is greater than a second distance from the surface of the touchscreen display, and wherein the first distance is less than or equal to the second distance.

In a nineteenth embodiment, with reference to the eighteenth embodiment, the first distance is 1 cm and the second distance is 5 cm.

In a twentieth embodiment, an electronic device comprises a touchscreen display, a ring button partially extending from an edge of the touchscreen display, and a ring button sensor positioned within the touchscreen display, wherein the ring button is configured to contact the ring button sensor to activate a function of the electronic device, and wherein the ring button is configured to rotate about an axis, wherein rotation about the axis activates a separate function of the electronic device.

In a twenty-first embodiment, with reference to the twentieth embodiment, contact of the ring button with the ring button sensor provides haptic feedback, auditory feedback, or a combination thereof.

In a twenty-second embodiment, with reference to the twentieth embodiment or the twenty-first embodiment, the ring button sensor is a piezoelectric film sensor.

What is claimed is:

1. An electronic stylus comprising: a shaft having a first end and a second end; a circuit positioned within the shaft; a single ring button positioned around an axis of the shaft extending between the first end and the second end; and a ring button sensor positioned within the shaft and connected to the circuit, wherein the ring button is configured to move in a direction perpendicular to a length of the shaft defined by the first end and the second end such that a first area of the ring button moves inward toward a center of the shaft to contact the ring button sensor or increase an amount of contact with the ring button sensor and a second area of the ring button, opposite from the first area, moves outward from the center of the shaft when the first area moves inward, and wherein the ring button is configured to contact the ring button sensor or increase the amount of contact with the ring button sensor to activate a function of the stylus or a function of an electronic device in communication with the stylus.

2. The electronic stylus of claim 1, further comprising: a tip sensor positioned at the first end of the shaft; and an end button positioned at the second end of the shaft, the end button configured to activate a separate function of the stylus or a separate function of the electronic device in communication with the stylus.

3. An electronic stylus comprising:
a shaft having a first end and a second end;
a circuit positioned within the shaft;
a ring button positioned around an axis of the shaft extending between the first end and the second end; and
a ring button sensor positioned within the shaft and connected to the circuit,
wherein the ring button is configured to contact the ring button sensor,
wherein the ring button is configured to contact the ring button sensor to activate a function of the stylus or a function of an electronic device in communication with the stylus,
wherein the function of the stylus or the function of the electronic device is based on a proximity of a tip sensor of the stylus to a touchscreen surface of the electronic device in communication with the stylus, and
wherein a first function is activated when the tip sensor is less than a distance from the touchscreen surface and a second function is activated when the tip sensor is greater than the distance from the touchscreen surface.

4. The electronic stylus of claim 1, wherein the function is programmable.

5. The electronic stylus of claim 1, wherein the function is a plurality of functions performed in series such that a first contact between the ring button and the ring button sensor activates a first function of the plurality of functions and a second contact between the ring button and the ring button sensor activates a second function of the plurality of functions.

6. The electronic stylus of claim 1, wherein the contact of the ring button with the ring button sensor provides haptic feedback, auditory feedback, or a combination thereof.

7. The electronic stylus of claim 1, wherein the ring button is configured to rotate about the axis of the shaft.

8. The electronic stylus of claim 7, wherein rotation about the axis activates a function of the stylus or a function of the electronic device in communication with the stylus.

9. The electronic stylus of claim 3, wherein the ring button comprises a plurality of ring button segments.

10. The electronic stylus of claim 1, wherein the ring button sensor is a piezoelectric film sensor.

11. The electronic stylus of claim 1, wherein an external diameter of the ring button is greater than an external diameter of the shaft adjacent to the ring button.

12. The electronic stylus of claim 1, wherein an external diameter of the ring button is equal to an external diameter of the shaft adjacent to the ring button.

13. A system comprising: an electronic device having a touchscreen display; and an electronic stylus in communication with the electronic device, the stylus comprising: a shaft having a first end and a second end; a circuit positioned within the shaft; a single ring button positioned around an axis of the shaft extending between the first end and the second end; and a ring button sensor positioned within the shaft and connected to the circuit, wherein the ring button is configured to move in a direction perpendicular to a length of the shaft defined by the first end and the second end such that a first area of the ring button moves inward toward a center of the shaft to contact the ring button sensor or increase an amount of contact with the ring button sensor and a second area of the ring button, opposite from the first area, moves outward from the center of the shaft when the first area moves inward, and wherein the ring button is configured to contact the ring button sensor or increase the amount of contact with the ring button sensor to activate a function of the stylus or a function of an electronic device in communication with the stylus.

14. The system of claim 13, wherein the electronic device is a tablet computer.

15. The system of claim 13, wherein the ring button is configured to rotate about the axis of the shaft, wherein rotation of the ring button activates movement of text or graphics on the touchscreen display up or down, or left or right.

16. The system of claim 13, wherein the function is based on a proximity of a tip sensor of the stylus to a surface of the touchscreen display,
- wherein a first function is activated when the tip sensor is less than a first distance from the surface of the touchscreen display and a second function is activated when the tip sensor is greater than a second distance from the surface of the touchscreen display,
- wherein the first distance is less than or equal to the second distance.

17. The system of claim 16, wherein the first distance is 1 cm and the second distance is 5 cm.

* * * * *